United States Patent [19]

Greaves, Jr.

[11] 4,340,009
[45] Jul. 20, 1982

[54] MEANS FOR PROTECTING UNDERGROUND TANKS FROM DAMAGE BY DIPSTICKS

[75] Inventor: Gerald G. Greaves, Jr., Houston, Tex.

[73] Assignee: Owens-Corning Fiberglas Corporation, Toledo, Ohio

[21] Appl. No.: 188,196

[22] Filed: Sep. 18, 1980

[51] Int. Cl.³ .............................................. G01F 23/00
[52] U.S. Cl. ..................................... 116/227; 145/3.7
[58] Field of Search ......................... 116/227; 145/3.7

[56] References Cited

U.S. PATENT DOCUMENTS 2,690,155  9/1954  Cary ..................................... 116/227

FOREIGN PATENT DOCUMENTS 372352  7/1939  Italy ................................... 116/227

Primary Examiner—Robert I. Smith
Attorney, Agent, or Firm—Ronald C. Hudgens; Kenneth H. Wetmore; Paul J. Rose

[57] ABSTRACT

An open-top, generally cylindrical housing including a bottom plate is droppable down the fill tube of an underground tank. A striking plate is resiliently supported in the housing by a coil spring or other resilient member.

10 Claims, 5 Drawing Figures

MEANS FOR PROTECTING UNDERGROUND TANKS FROM DAMAGE BY DIPSTICKS

TECHNICAL FIELD

This invention relates generally to underground tanks, and more particularly to a means for protecting them from damage by dipsticks.

BACKGROUND ART

Aluminum dipsticks are frequently used to measure the contents of underground storage tanks. Comparison of daily readings with metered pumpage gives an indication of the presence of leaks. Careless operators may drop the dipsticks or, even more irresponsibly, throw the dipsticks down the fill tube, causing damage to the bottom of the tank beneath the fill tube. For tanks made of glass fiber reinforced plastic, prior attempts to prevent damage from dipsticks have included installing steel plates at the bottom of the tank beneath the fill tube and pouring rubberized epoxy resin down the fill tube.

Because contractors frequently install the fill tube in other than the intended fitting, some companies order metal plates under all fittings at the time an order is placed for a tank. The different plate specifications render it difficult to maintain a line of standard tanks.

DISCLOSURE OF INVENTION

In accordance with the invention, an open-top generally cylindrical spring housing is provided. A coil spring or other type of spring is secured at its lower end to a bottom plate of the spring housing and has a striking plate secured to its upper end. The striking plate is reciprocable in the spring housing along with the upper end portion of the spring. A rubber-like pad is secured to the outer side of the bottom plate of the spring housing. The entire assembly can be dropped down the fill tube of an existing tank to protect the bottom of the tank from damage by a dipstick. The spring housing has a greater height than the clearance between the fill tube and the bottom of a tank, and an upper portion thereof is therefore retained in the fill tube.

BRIEF DESCRIPTION OF DRAWINGS

The invention is described with reference to the accompanying drawings in which.

BEST MODE OF CARRYING OUT THE INVENTION

Figure 1:
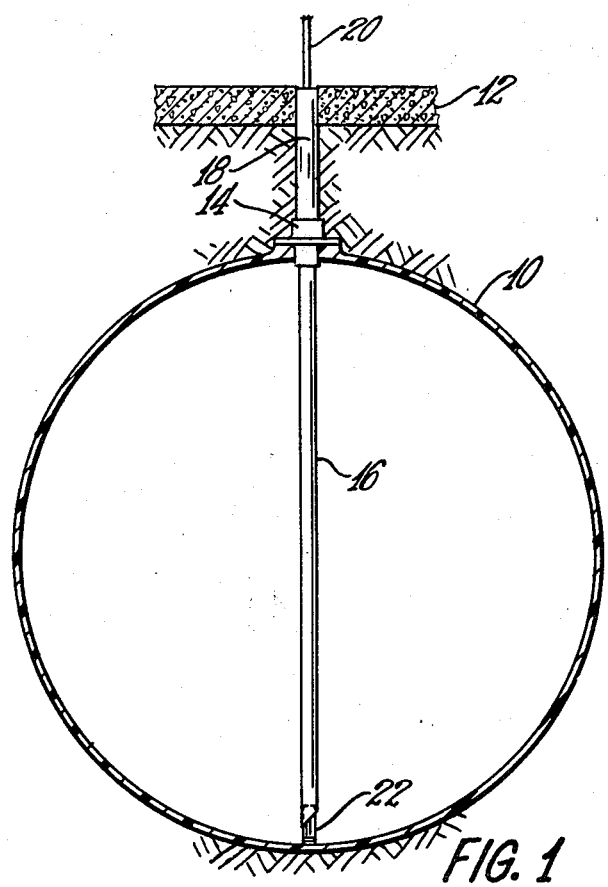
FIG. 1 is a cross-sectional elevational view of an underground tank having a protector constructed in accordance with the invention mounted in the fill tube thereof.
Figure 2:
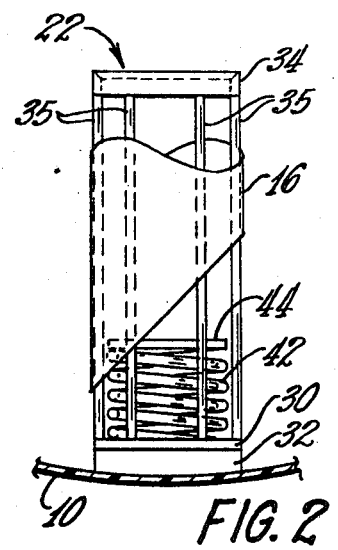
FIGS. 2, 3, 4, and 5 are enlarged fragmentary elevational views, partially in section, of four different embodiments of the protector of the invention, each installed in the fill tube of an underground tank.
Figure 3:
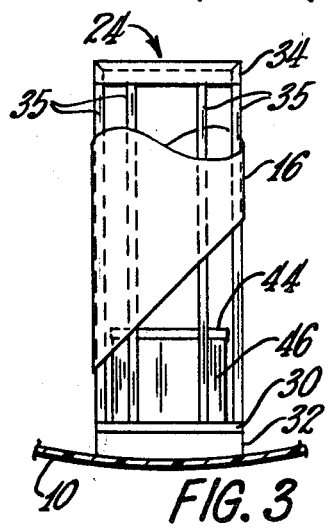
Figures 4, 5:
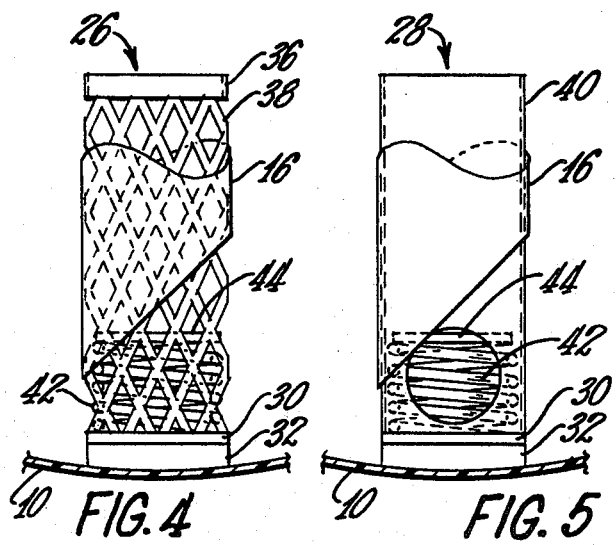

With respect to the drawings, FIG. 1 illustrates an underground storage tank 10 made of glass fiber reinforced plastic and mounted beneath a concrete slab 12. The tank 10 includes a fitting 14 having an inner fill tube 16 secured in a lower end portion thereof and an outer fill tube 18 secured in an upper end portion thereof. The upper end of the outer fill tube 18 is secured in the concrete slab 12. A portion of a dipstick 20 is shown extending from the outer fill tube 18.

In accordance with the invention, a protector against damage by dipsticks is mounted in the lower end of the inner fill tube 16. FIGS. 2, 3, 4, and 5 respectively show protectors 22, 24, 26, and 28 constructed in accordance with the invention. The preferred embodiment is the protector 22 shown in FIG. 2.

Each of the protectors 22, 24, 26, and 28 includes a bottom plate 30, with an exterior resilient pad 32 attached thereto, as parts of an open-top, generally cylindrical spring housing. The spring housing of each of the protectors 22 and 24 includes an upper ring 34 connected to the bottom plate 30 by six rods 35, only four of which are shown. The spring housing of the protector 26 includes an upper ring 36 connected to the bottom plate 30 by an expanded metal tube 38. The spring housing of the protector 28 includes a metal tube 40 connected to the bottom plate 30. In each of the protectors 22, 26, and 28, a coil spring 42 is secured to the bottom plate 30 and also to a striking plate 44 reciprocable within the spring housing along with the upper end portion of the spring. Instead of a coil spring 42, the protector 24 is provided with a resilient tube 46 bonded adjacent opposite ends respectively to the bottom plate 30 and the striking plate 44. Except for the resilient pads 32 and the resilient tube 46, the remaining parts of the protectors are preferably made of stainless steel.

In both new and previously installed tanks 10, one of the protectors 22, 24, 26, and 28 can be merely dropped down the fill tube 16 without an operator's having to enter the tank. Thereafter a dipstick 20 can be carelessly dropped or thrown into a tank 10 through the outer fill tube 18 and the inner fill tube 16 and it will hit the reciprocable striking plate 44. Excess energy will be absorbed by the spring 42 or resilient tube 46, saving the tank 10 from damage.

Various modifications may be made in the structure shown and described without departing from the spirit and scope of the invention.

I claim:

1. For use with a cyclindrical underground storage tank (10) having an opening in an upper wall portion thereof and an inner fill tube (16) in communication with the opening, the inner fill tube extending downwardly from the opening for a greater portion of the length of an inside diameter of the tank and having a lower end portion spaced from a lower wall portion of the tank, means (22, 24, 26, 28) for protecting the lower wall portion of the tank from damage by a dipstick (20), said protecting means being adapted to be dropped down the inner fill tube into a position wherein it is supported by the lower wall portion of the tank and comprising an open-top, generally cylindrical housing including a bottom plate (30, 34, 35, 36, 38, 40), a resilient member (42, 46) inside the housing adjacent the bottom plate, and a striking plate (44) disposed in the housing adjacent the resilient member and being reciprocable within the housing along with an upper end portion of the resilient member upon the striking of the plate by a dropped dipstick.

2. Protecting means as claimed in claim 1 wherein the resilient member is a coil spring (42).

3. Protecting means as claimed in claim 1 wherein the resilient member is a resilient tube (46).

4. Protecting means as claimed in claim 1 wherein the resilient member (42, 46) is secured to the bottom plate (30).

5. Protecting means as claimed in claim 1 wherein the resilient member (42, 46) is secured to the striking plate (44).

6. Protecting means as claimed in claim 1 wherein the height of the housing (34, 35, 36, 38, 40) is greater than the clearance between the fill tube (16) and the bottom of a tank (10).

7. Protecting means as claimed in claim 1 wherein the housing (34, 35, 36, 38, 40), the resilient member (42, 46), and the striking plate (44) are made of stainless steel.

8. Protecting means as claimed in claim 1 wherein the bottom plate (30) is circular.

9. Protecting means as claimed in claim 1 wherein the striking plate (44) is circular.

10. Protecting means as claimed in claim 1 including a resilient pad (32) attached to the exterior of the bottom plate (30).

* * * * *